(12) United States Patent
Abdulhayoglu

(10) Patent No.: US 10,970,752 B1
(45) Date of Patent: *Apr. 6, 2021

(54) SYSTEM AND PROCESS FOR DISPLAYING MEDIA CONTENT FILES IN AN UNBLOCKABLE MANNER

(71) Applicant: Melih Abdulhayoglu, Montclair, NJ (US)

(72) Inventor: Melih Abdulhayoglu, Montclair, NJ (US)

(*) Notice: Subject to any disclaimer, the term of this patent is extended or adjusted under 35 U.S.C. 154(b) by 49 days.

This patent is subject to a terminal disclaimer.

(21) Appl. No.: 15/484,097

(22) Filed: Apr. 10, 2017

Related U.S. Application Data

(60) Provisional application No. 62/321,442, filed on Apr. 12, 2016.

(51) Int. Cl.
*G06Q 30/02* (2012.01)
*G06F 16/958* (2019.01)
*H04N 21/222* (2011.01)
*H04N 21/81* (2011.01)

(52) U.S. Cl.
CPC ....... *G06Q 30/0277* (2013.01); *G06F 16/958* (2019.01); *G06Q 30/02* (2013.01); *G06Q 30/0242* (2013.01); *G06Q 30/0251* (2013.01); *H04N 21/222* (2013.01); *H04N 21/812* (2013.01)

(58) Field of Classification Search
CPC .............. G06Q 30/02; G06Q 30/0277; G06Q 30/0242; G06Q 30/0251; H04N 21/222; H04N 21/812
See application file for complete search history.

(56) References Cited

U.S. PATENT DOCUMENTS

| | | | | |
|---|---|---|---|---|
| 7,058,633 | B1* | 6/2006 | Gnagy | G06F 16/9566 |
| 8,239,491 | B1* | 8/2012 | Tsun | G06F 16/9574 |
| | | | | 709/219 |
| 8,745,753 | B1* | 6/2014 | Gottlieb | G06Q 30/0277 |
| | | | | 726/26 |
| 9,992,259 | B2* | 6/2018 | Lind | H04L 67/2895 |
| 10,104,039 | B1* | 10/2018 | Knecht | H04L 61/2592 |
| 2010/0094704 | A1* | 4/2010 | Subramanian | G06Q 30/02 |
| | | | | 705/14.45 |
| 2015/0262235 | A1 | 9/2015 | Neal | |
| 2016/0105449 | A1* | 4/2016 | Montagnon | H04L 67/2814 |
| | | | | 726/22 |
| 2017/0068644 | A1 | 3/2017 | Jones | |
| 2017/0237823 | A1 | 8/2017 | Pyper | |
| 2018/0150877 | A1 | 5/2018 | Hod | |

* cited by examiner

*Primary Examiner* — Glenton B Burgess
*Assistant Examiner* — Rachel J Hackenberg
(74) *Attorney, Agent, or Firm* — Joseph P. Aiena

(57) ABSTRACT

There is provided a system and process of delivering online media content files to websites which are not capable of being blocked. The system and process provides a publisher with a sub-domain name that is pointed to an IP provided by an ad server and ask publisher to update his DNS records. Concurrently, the system delivers the user a script on the newly suggested sub domain that publisher inserts in HEAD tag of web pages where it is determined that the unblockable ads are to be displayed.

10 Claims, 8 Drawing Sheets

SYSTEM AND PROCESS FOR DISPLAYING MEDIA CONTENT FILES IN AN UNBLOCKABLE MANNER

CROSS REFERENCE TO RELATED APPLICATIONS

This application claims benefit of and priority to U.S. Provisional Application Ser. No. 62/321,442 filed on Apr. 12, 2016, and which is incorporated by reference herein its entirety.

FIELD OF THE INVENTION

The present invention relates to a service, which allows a publisher to show online ads and online media content files, such as video, graphic, audio or text advertisements and combinations thereof in-spite of presence of ad blocker. The solution works whether ad blocker is present in user's web browser or on user's computer outside web browser.

BACKGROUND

Online advertising is the sole source of revenue for publishers, who provide free contents to end users. In last couple of years online advertising has become very aggressing where nature of ads have become disruptive and at the same time ads have started consuming lot of bandwidth and thus slowing down time it takes to load a web page.

Above mentioned problems have led to emergence of ad blocking technologies, which block ad related html code present on web pages. Ad Blockers are designed for web browser specifically and also designed to be installed in computer so that they can block ads appearing on any application including browsers. Ad blockers have three types of rules:
  Specific domains blacklist, any web request on those domains is blocked by Ad Blocker
  There are some generic rules e.g. any request which match wild card based rule for */ads/* will be blocked.
  There are html element specific rules; and if such an html code is found on any web page, its execution will be blocked or it will be hidden from user view.
Any ad server that does not become part of this blacklist ends up showing ads until that ad server becomes part of black list.

Traditionally ad serving business requires specialization and publisher have to take services of some 3$^{rd}$ party ad serving companies. Ad serving companies have relationship with various advertisers and thus publisher does not have to establish that one is to one relationship with every advertiser. When a publisher signs up with an ad serving company, it provides html code based on their own domains. As ads are served on various publisher websites using ad tag on same domain of ad serving company, it makes Ad Blockers to easily block ads on all publisher sites using ad tag from same ad serving company by simply adding ad server related domain in black list.

However Ad Blockers do not block html contents served on publisher domain or sub domains as they may be crucial for functioning of publisher website unless they have website specific such rules.

Considering a single ad server may be providing good ads and at the same time may provide disruptive/bloated ads also, blocking of ad server company related domain results in blanket blockage of ads on publisher site.

SUMMARY

The system of present invention solves problem of publisher explained in previous section. As briefly explained in previous section that online advertising is a specialized domain and publisher has to sign up services of one of online advertising ad serving companies. This arrangement means that publisher gets an ad tag and thus ad related html contents on his website are served from outside publisher domain and if ad serving company domain is blocked, ads on his websites get blocked if user is using ad blocker.

The system of presented invention solves this problem by asking publisher to change his DNS server to one provided by solution of present invention. This allows solution to provide a script that has random sub domain and because publisher is using solution provided DNS server, any sub domain that is not explicitly defined in DNS resolves to IP of Ad Server provided by solution.

This script provided by solution has to be added by publisher in HEAD tag of every web page where unblockable ads functionality needs to be exposed.

For the matter of sub domain, publisher is given an example sub domain, however he is free to use any random sub domain as long as its IP resolves to IP of Ad Server provided by solution of the presented invention.

Considering ad serving script is on publisher sub domain, ad blockers are not likely to block that script while contents of that script are really delivered from ad server. This avoids using non-publisher domain that serves ads on publisher's web pages.

This embedded script is intelligent enough to detect presence of Ad Blocker and in case Ad Blocker is not present, it does not do anything as ads can be delivered from ad serving company publisher have initial contract in place to show ads.

This way solution only becomes active if ad blocker is present as that's the objective of this service i.e. show ads if ad blocker is present and thus shown ads become unblockable ads.

BRIEF DESCRIPTION OF THE DRAWINGS

The accompanying drawings illustrate various embodiments of the present invention and system and are part of the specification. The illustrated embodiments are merely examples of the present system and invention and do not limit the scope thereof.

FIG. 1(*b*) is a schematic illustration of showing logic flow inside web browser when a web page is browsed by user.

FIG. 1(*c*) is continuation of logic flow described in FIG. 1(*b*).

FIG. 1(*d*) is a schematic illustration of showing logic flow inside Ad Server of proposed invention.

FIG. 1(*e*) is a schematic illustration showing logic flow inside DNS server provided by solution of presented invention and used by publisher to resolve his domains to defined IPs.

DETAILED DESCRIPTION

Figure 1A:
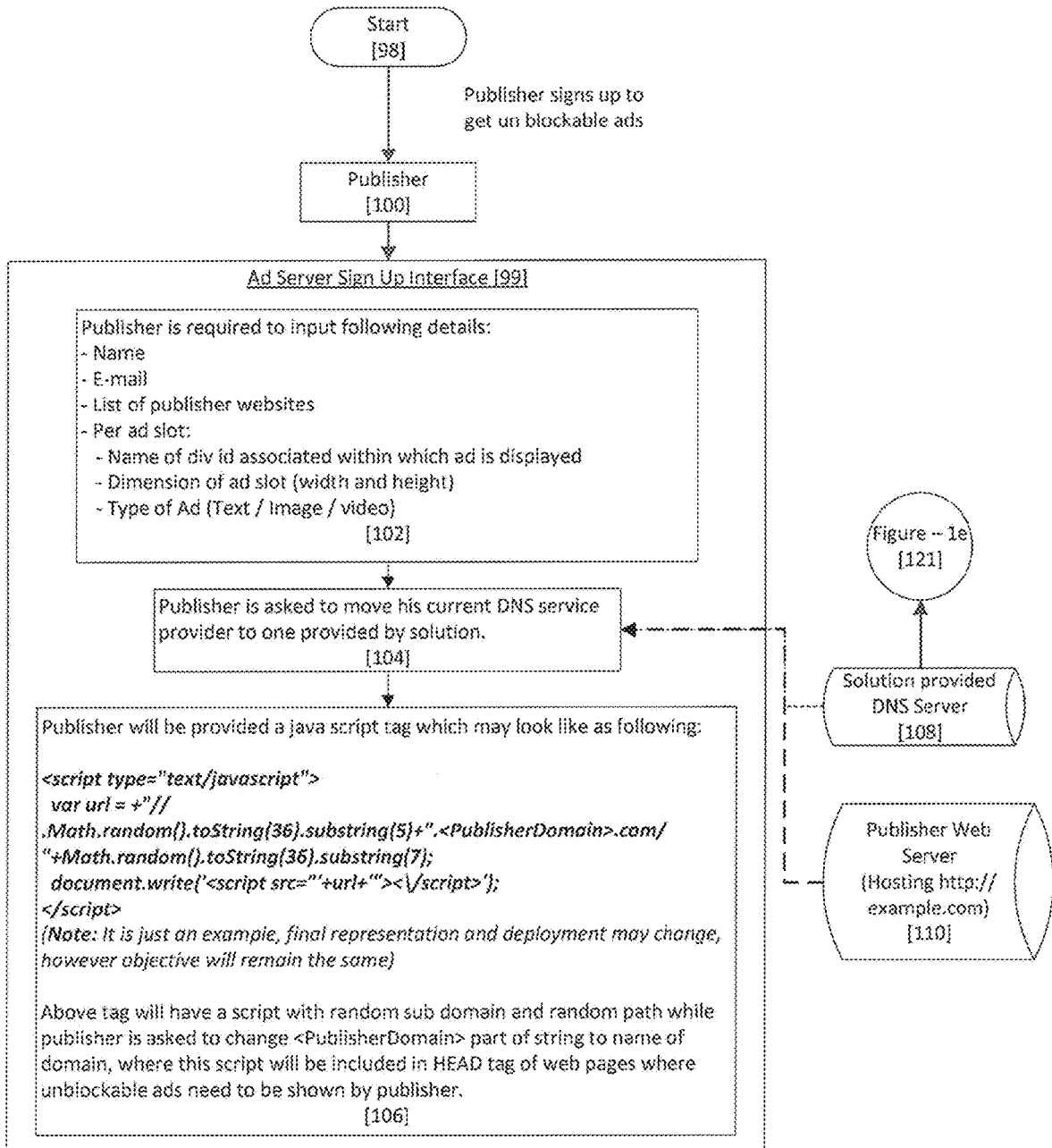
FIG. 1(*a*) is a schematic illustration of the publisher signing up services provided by system of present invention.

FIG. 1*a* It shows the start [98] of process that begins with publisher [100] going to website [99] exposed by system of present invention, where publisher [100] is required to sign up by submitting details indicated in box [102]. Apart from his name and email, publisher is expected to submit list of websites where he will use the solution and also name of html div elements with their sizes (i.e. width and height) and type (i.e. image/banner/video) of ad expected in each ad slot. This enables solution to find ad slots on publisher page and in case Ad Blocker is present, inserts unblockable ad. Box [104] shows that publisher is asked to move his DNS hosting from current provider to DNS service provided by system of proposed solution. Inner working of DNS solution used by publisher is explained in detail in FIG. 1(e). Box [106] shows that after publisher agrees to manage his DNS provided by solution, publisher is provided a piece of Java script that he needs to include in HEAD html element of every web page where publisher wants to achieve unblockable ads functionality.

Figure 1B:
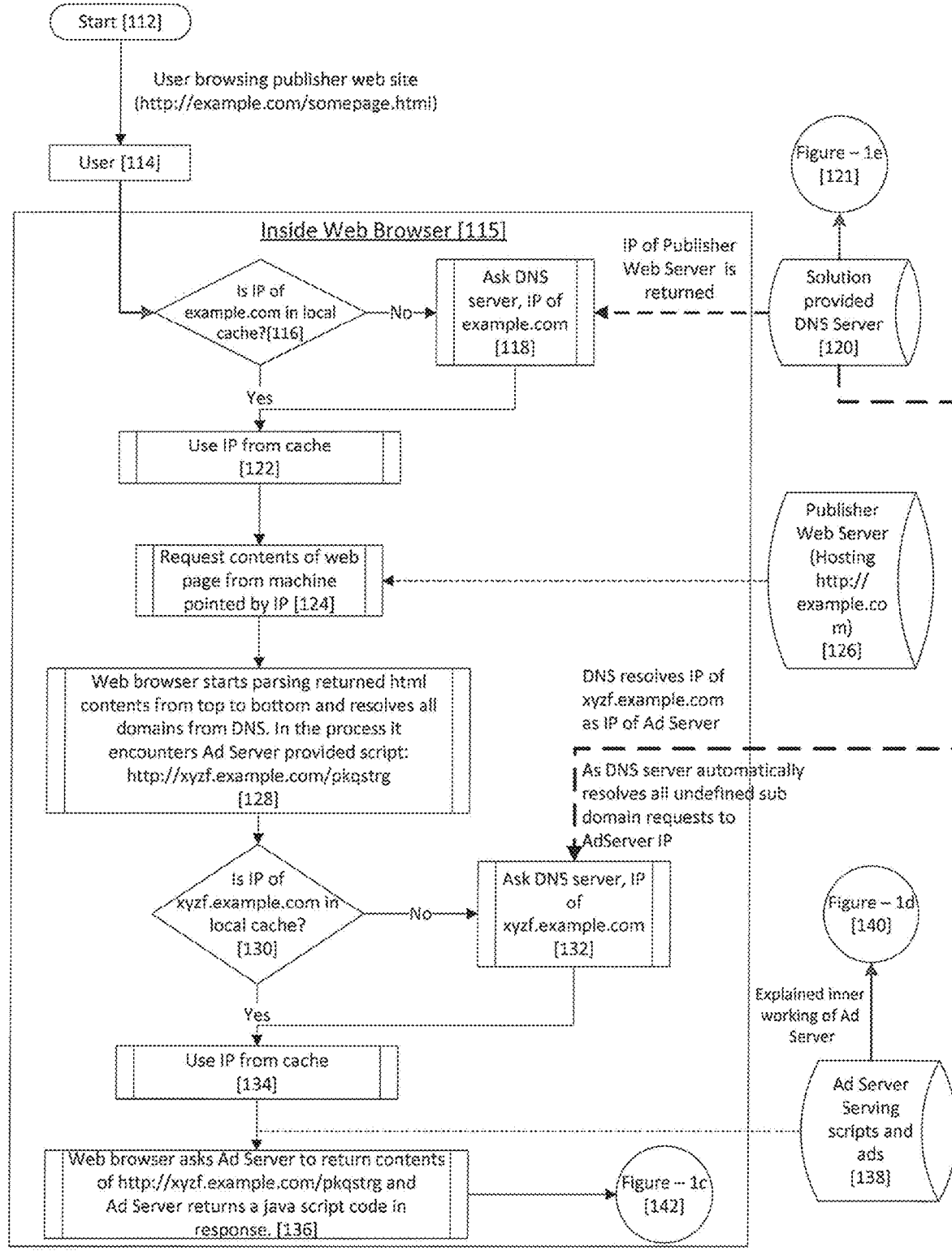

FIG. 1(b) shows as what transpires inside web browser [115] when a user [114] browses some page http://example.com/somepage.html on publisher web site. First browser resolves domain and to do that, it first checks in local cache as shown in box [116];

if IP is not found, it tries to find IP of the domain as shown in box [118] and IP of domain comes from DNS server [120] what publisher has used as its DNS server. In case IP of publisher domain is found in browser cache it is used as shown in box [122]. After browser gets IP of domain, as shown in box [124], it requests contents of example web page URL http://example.com/somepage.html from publisher web server [126]. Box [128] shows that returned web page contents are parsed html element by html element and in that process web browser encounters script tag provided by solution of proposed system. As described in FIG. 1(a), script has to be added in HEAD tag of web page and it looks like "<script type="text/javascript"> var url=+"//.Math.random( ).toString(36).substring(5)+".<PublisherDomain>.com/"+Math.random( ).toString(36).substring(7); document.write('<script src="'+url+'"><\/script>'); </script>". It creates a random sub domain on publisher domain and at the same time also creates a random file on publisher domain, this way Ad Blockers can't fix their logic to block a specific sub domain or specific path on domain, so a possible outgoing call for ad could look like http://xyzfk.example.com/pkqstg, browser again checks in [130] if IP of xyzfk.example.com is in browser cache, if not, then it asks IP of xyzfk.example.com as shown in box [132] from publisher used DNS server [120]. Inner functioning of DNS server is further explained in detail under FIG. 1e. It is assumed that publisher is using system provided DNS server, where DNS ensures that such requests are resolved to IP of Ad Server of proposed solution as explained in FIG. 1(a); web browser requests contents of script from Ad server [138] of proposed solution. Internal logic of proposed solution web server is further explained in FIG. 1(d). Web browser logic is continued on FIG. 1(c).

Figure 1C:
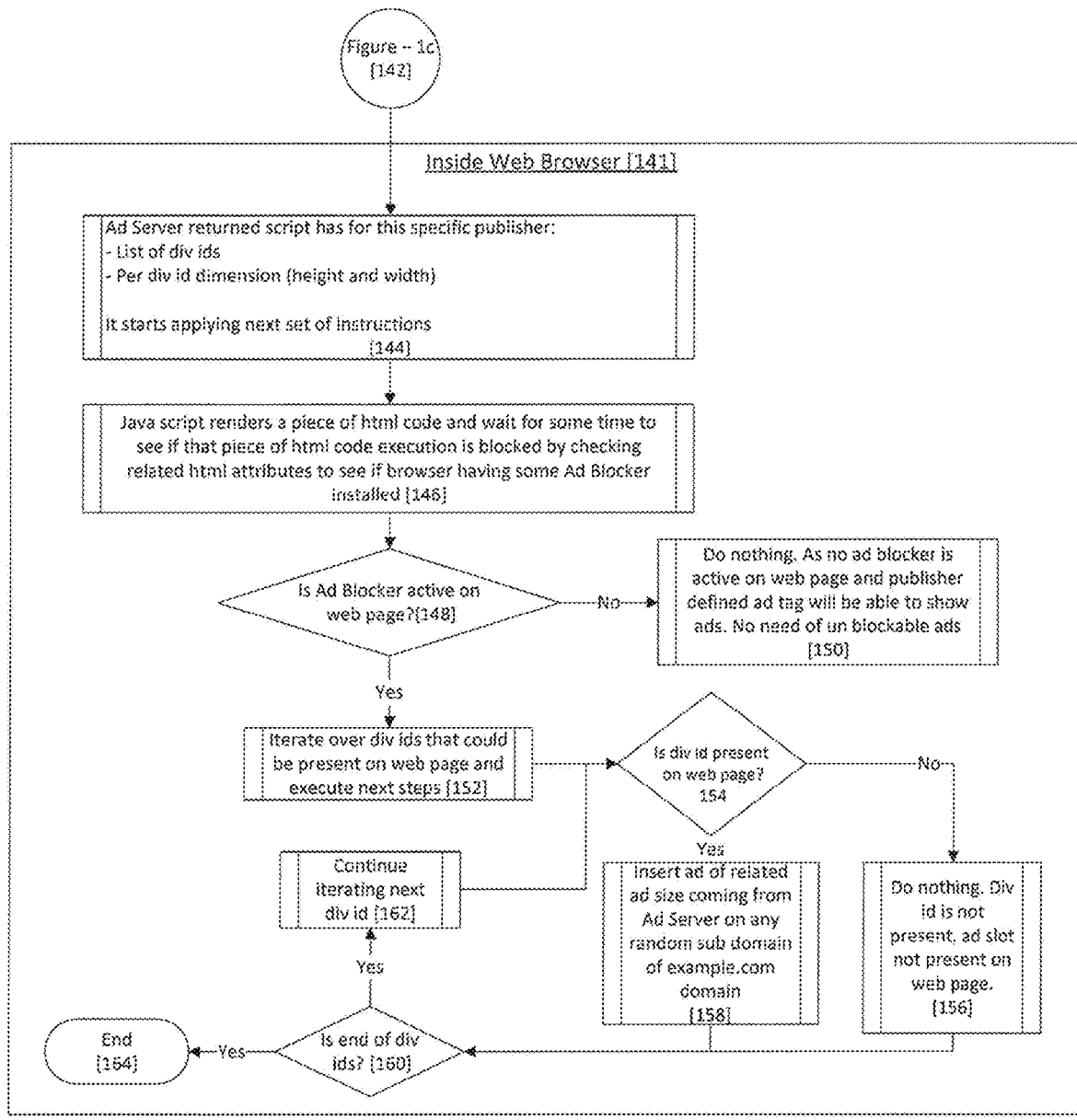

FIG. 1(c) is continuation of logic as is described in FIG. 1(b). After web browser gets script from Ad server [138] of proposed solution, script is supposed to contain information about div ids and their respective sizes as may be present on page as shown in box [144]. When script is executed [146], it first checks if Ad Blocker is active on web page or not by rendering a piece of html element that is expected to be blocked/hidden by Ad Blocker. If script determines in box [148] that ad blocker is not present, it does not do anything as shown in box [150] as solution of proposed invention gets active only in case ad blocker is present else not. In case it is determined in box [148] that Ad Blocker is active on web page, it iterates all div ids received from server as previously indicated in box [144], and then tries to find every div id in loaded web page as depicted in box [152]. For each div id, it makes a check as shown in box [154] if that div id is present on page or not, if not present, as shown in box [156] it continues to check presence of next div, if any, else if div is found, as shown in box [158], script injects html code that brings ad of type and size as defined against that div by publisher during sign up process. This way, in designated div html element, solution of proposed invention shows ad in-spite of presence of Ad Blocker. All scripts, which are involved during fetching ad for a given div, are always on example random sub domain that was created initially on the fly i.e. xyzfk.example.com domain and thus they don't get blocked as Ad Blocker extension thinks they are being served by publisher itself and are important for functioning of publisher site. Script further checks as shown in box [160] if it has reached end of div elements, if yes, execution of script ends.

Figure 1D:
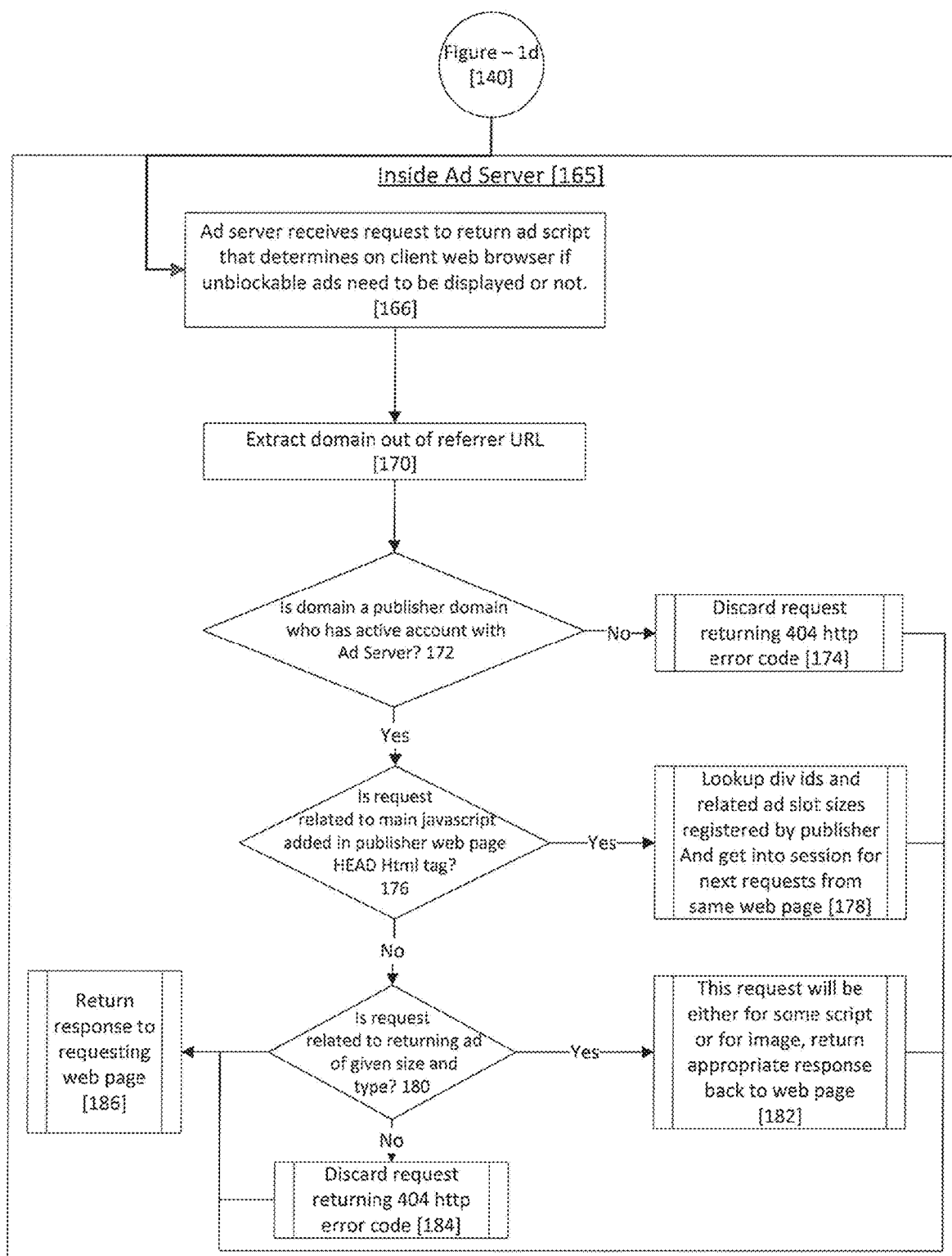

FIG. 1(d) briefly explains logic inside Ad server [165] of proposed solution. As shown in box [166], ad server receives requests from various publisher web pages; who may have signed up with solution of proposed system. From incoming request, ad server extract domain name as indicated in box [170] to identify the requesting publisher. In box [172] it checks if extracted domain is one of registered domains by some publisher or not, if not, then it discards the request as shown in box [174]. In case domain is registered as shown in decision box [176] it is checked further in decision box [176] as what kind of request is to be served, if request is related to script that is supposed to be added in HEAD html element of web page then publisher registered domain related div ids are looked up as shown in box [178] and their respective ad slot sizes are returned back to web page. In case in decision box [176] it is determined that request is for some other contents i.e. some other script needed to display ad or request is for image, it is served as shown in box [182], anything else is discarded as shown in box [184] Finally box [186] shows that Ad server returns response to requesting web page.

Figure 1E:
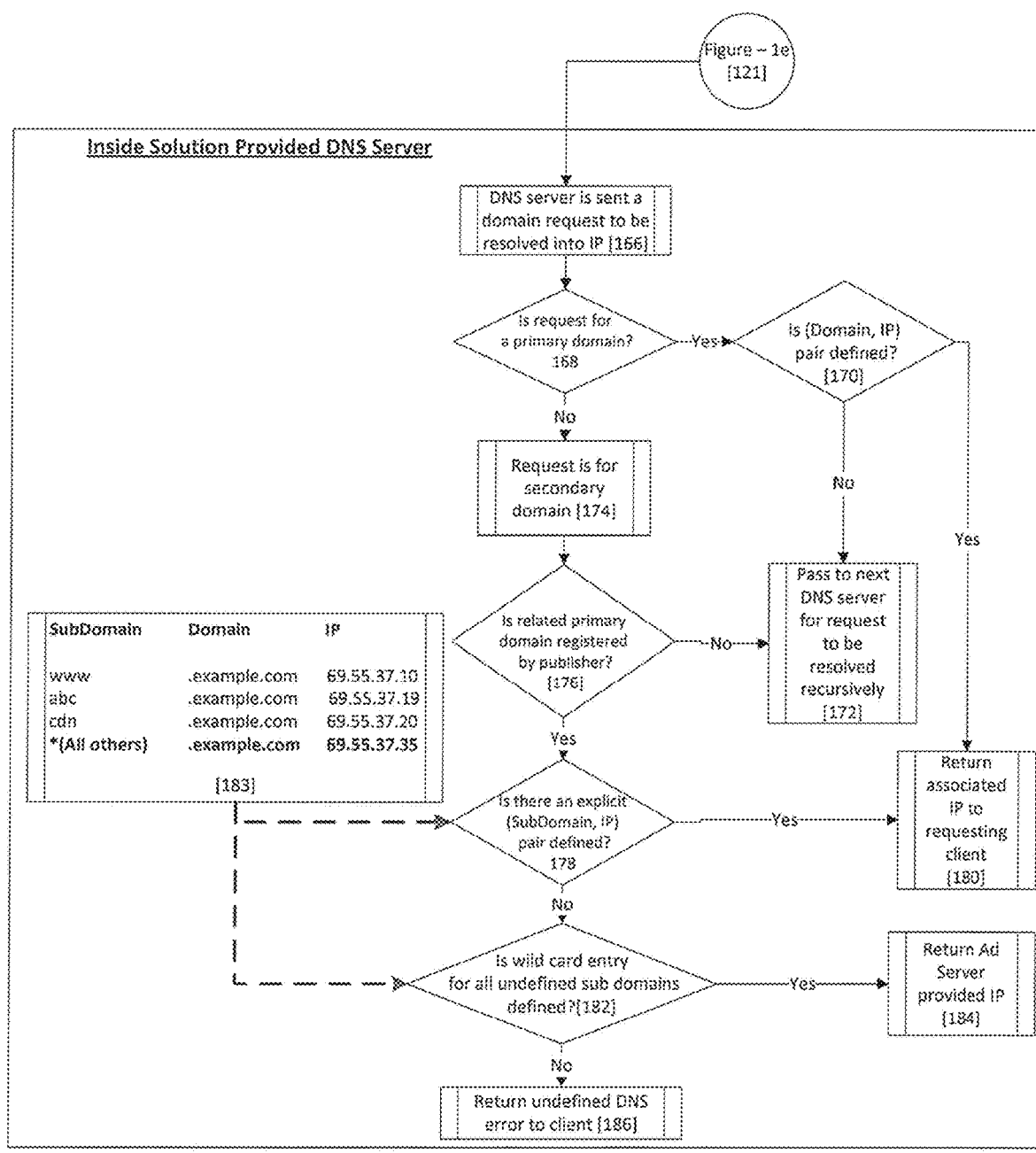

FIG. 1(e) explains functioning of DNS (Domain Name Server) server as provided to publisher by solution of proposed system. A DNS server is used to resolve a given domain name into a unique IP. The DNS server provided by solution of presented invention is no different than any standard DNS server it is just aware that in case publisher wants to use a random sub domain string, it is resolved to Ad Server provided IP. As explained in FIG. 1(b) that publisher uses ad script that uses a random sub domain, and it is further explained in FIG. 1(c) that every sub domain is resolved into IP by using publisher used DNS server and in this case it happens to be DNS server provided by solution of present invention. In box [183] there is a table that shows as how DNS server is configured. The first entry for www indicates that if DNS is requested resolution of www.example.com it returns 69.55.37.10 and similarly if for either abc or cdn DNS resolution request comes, IPs 69.55.37.19 and 69.55.37.20 are returned respectively. But say a random sub domain xyzck is requested to be resolved, considering there is no explicit entry for it defined, the resolution is done based on wild card entry as indicated in box [183] by "*(All Other)" that is shown to be resolved to 69.55.37.35 and DNS server will configure that entry to IP of ad server of proposed solution. The diagram shows that DNS server gets domain string to be resolved in IP as shown in box [166]. It checks if domain is a primary domain e.g. example.com without sub domain as shown in box [168]. If it is a primary domain, it checks in decision box [170] if IP of that domain is defined in DNS server, if yes, defined IP is returned to requesting client as shown in box [180] else request is forwarded to next DNS server to be resolved recursively as shown in box [172]. In case in decision box [168] it is found that domain request to be resolved is for a sub domain, as indicated in box [174], it is further checked if associated primary domain (i.e. out of xyzf.example.com system extracts example.com and checks if example.com is registered by some publisher) is defined by publisher as indicated in decision box [176]. If it is found that primary domain is not registered by any publisher, request is forwarded to next DNS server as shown in box [172] to be resolved recursively. In case in decision box [176] it is determined that primary domain belongs to one of registered publisher, it is further checked in box [178] if there is an explicit entry mapping that sub domain to some IP, if yes, as shown in box [180] that IP is returned to requesting client else it is checked in decision box [182] if in DNS we have wild card entry i.e. *.example.com defined that defines as what IP to return for all undefined sub domain requests, if not then Non-Existent-Domain error is returned by server as shown in box [186] else client is returned IP of Ad Server as provided by solution of present invention as shown in box [184].

Figure 2:
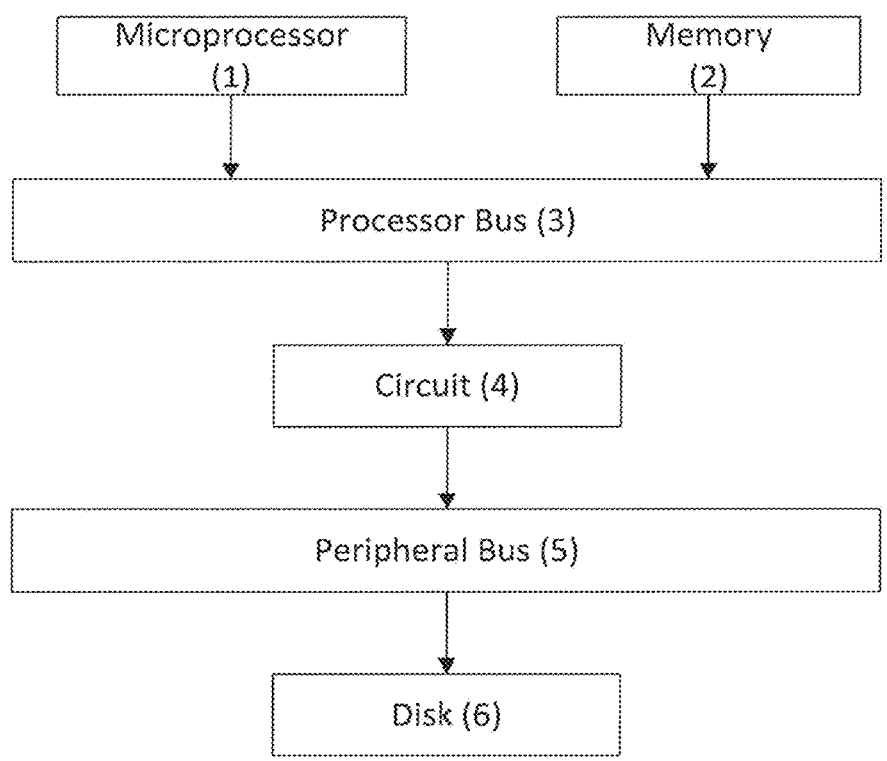
FIG. 2 is a schematic illustration of the connections of a computing system.

FIG. 2 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

Figure 3:
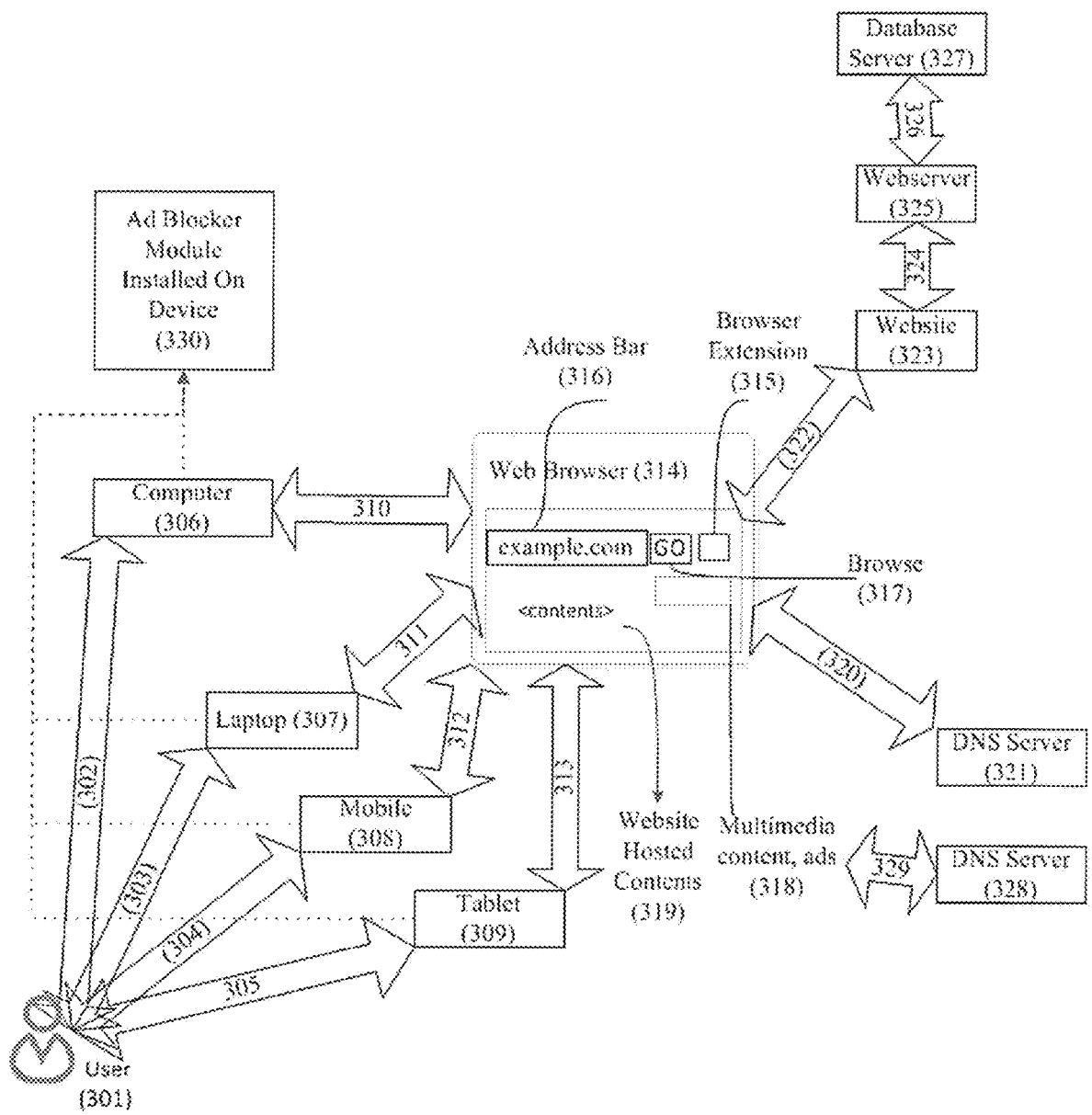
FIG. 3 is a schematic illustration of communication process when the Internet is browsed by a user.

FIG. 3 is a description of how communication works when the web is browsed and shows that a user (301) can use computer (306), laptop (307), mobile (308) or a tablet (309) to launch a web browser (314) installed on that specific device to browse a specific website (323). The user can enter an address of some chosen web site on the address bar (316) and press a browser specific option to indicate to the browser to browse, as shown in FIG. 3 via button "Go" (317). After a user presses a browser specific option to navigate to a given web page as shown in FIG. 3 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329.

In FIG. 3, browser extension (315) is shown to be installed in web browser that has capability to block any outgoing web request; and at the same time can block any html element present on web page using some pre-defined blacklist of outgoing URLs. At the same time a device may also be using one or other ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus depending on device setup, a web request may be blocked at browser level via ad blocker installed as browser extension (315) or may be blocked at network level using software module installed on device at network level and acting as ad blocker (330).

Figure 4:
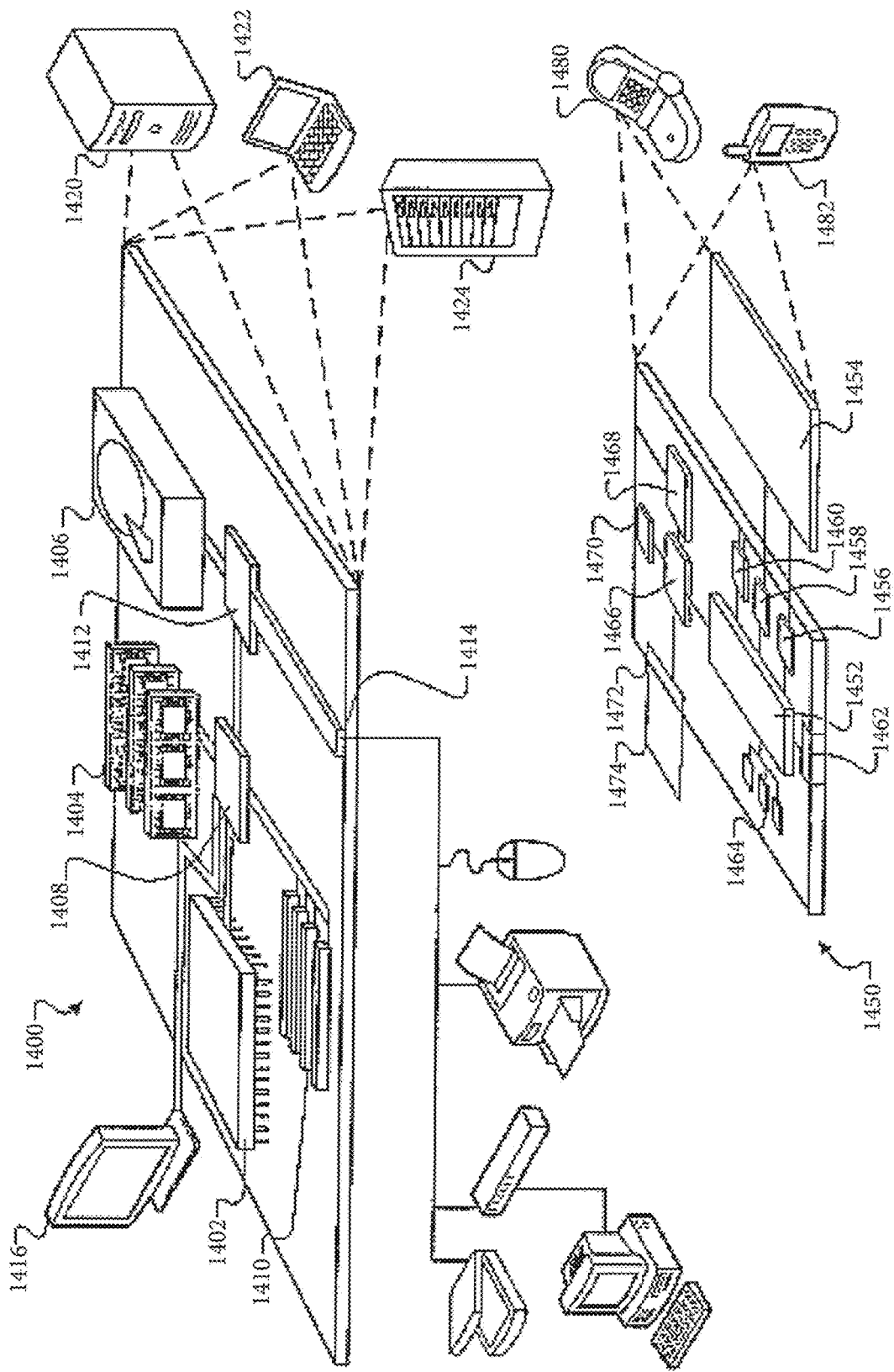
FIG. 4 is an illustration of a computer and mobile devices and their components.

FIG. 4 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A system for displaying unblockable media content files on web pages, comprising:
   a computer having a processor and memory connected to a processor bus, said processor bus connected by circuitry to a periphery bus and a disk;
   said computer operated and in communication with a domain server via a web browser wherein a publisher with a DNS hosting setting is asked to change said DNS hosting setting;
   said web browser uses an IP address from a local cache and said web browser requests said IP address from a DNS server of said publisher when said IP address is not in said local cache;
   said web browser requests content of an example web page from a web server of said publisher pointed by said IP address;
   said web browser parses returned html content and resolves all domains from said DNS server wherein said web browser creates a random subdomain on a domain of said publisher and creates a random file on said domain of said publisher wherein said web browser uses said IP address of a local cache;
   said web browser requests said IP address from said DNS server of said publisher when said IP address is not in said local cache;
   said web browser requests contents of a script from an ad server which provides said script in response wherein said script contains information about div ids and sizes of said div ids;
   said script provides a piece of a html code to check if an ad blocker is installed;
   said script iterates over div ids present on web pages wherein said script injects a html code generating an ad of type and size defined by said publisher.

2. A system of the claim 1 further comprising:
   said ad server receives a request from web pages of said publisher and
   extracts a domain to identify said publisher;

said request is for said domain registered by said publisher and is related to a script in a web HEAD html tag of said publisher wherein related div ids are looked up and related ad slot sizes are returned to a web page;
said request only accepted if said request for said domain registered by said publisher is actually registered by said publisher and for a returning an ad of a given size and type;
said request is for script or image returning an appropriate response to said web page by said ad server.

3. A system of the claim 2 further comprising wherein:
said request is for a primary domain registered in said DNS server where said IP address is returned to a client and when said request is for a primary domain not registered in said DNS server, request passes to a second DNS server to be resolved recursively;
said request is for a sub-domain whose primary domain is registered by said publisher wherein an explicit entry maps said sub-domain to said IP address and said IP address returns to said client;
said request for said sub-domain whose primary domain is not registered by said publisher passes to the second DNS server to be resolved recursively;
said request for said sub-domain whose primary domain registered by said publisher wherein a wild card entry defines a return IP address for all sub-domain requests not explicitly mapped and said return IP address is returned to said client.

4. The system of claim 1 wherein said system is triggered upon detection of an installed ad blocker.

5. The system of claim 1 wherein no action is taken by said script when said ad blocker is not installed.

6. The system of claim 2 wherein said publisher provides:
publisher name,
publisher email correspondence address,
a list of publisher websites,
and media content slot details including:
    name of div id associated with ad content to be displayed,
    width and height dimensions of the ad slot,
    and the type of media content do be displayed,
in an ad server sign up interface.

7. The system of claim 2 wherein a 404 http error code is returned when said request for said domain is registered by said publisher who does not have an active account.

8. The system of claim 2 wherein a 404 http error code is returned when said request is not related to returning said ad of a given size and type.

9. The system of claim 2 wherein no action is taken when div ids are not present on the web page.

10. The system of claim 3 wherein said wild card return IP address entry is the IP address of an ad server;
said ad server returning the request with an ad of related ad size to be inserted on any random subdomain of said publisher's primary domain.

* * * * *